US007701392B2

(12) United States Patent

Nakajima et al.

(10) Patent No.: US 7,701,392 B2

(45) Date of Patent: Apr. 20, 2010

(54) ANTENNA SYSTEM

(75) Inventors: Nobuo Nakajima, Chofu (JP); Koichi Gyoda, Chofu (JP); Takehiro Onomatsu, Daito (JP); Hideto Yoshimura, Daito (JP); Eiji Shibuya, Kobe (JP)

(73) Assignees: The University of Electro-Communications, Chofu-shi (JP); Funai Electric Co., Ltd., Daito-shi (JP)

( * ) Notice: Subject to any disclaimer, the term of this patent is extended or adjusted under 35 U.S.C. 154(b) by 103 days.

(21) Appl. No.: 12/104,841

(22) Filed: Apr. 17, 2008

(65) Prior Publication Data

US 2008/0258972 A1 Oct. 23, 2008

(30) Foreign Application Priority Data

Apr. 18, 2007 (JP) ............................ 2007-109328

(51) Int. Cl.
*H01Q 3/00* (2006.01)
*H04N 7/20* (2006.01)

(52) U.S. Cl. ........................................ 342/359; 725/72

(58) Field of Classification Search ................ 342/359; 725/72

See application file for complete search history.

(56) References Cited

U.S. PATENT DOCUMENTS 5,376,941 A * 12/1994 Fukazawa et al. ........... 342/359
5,771,015 A * 6/1998 Kirtman et al. ............. 342/359

FOREIGN PATENT DOCUMENTS

JP 2001-86019 A 3/2001
JP 2001-94899 A 4/2001
JP 2005-318140 A 11/2005
JP 2005-354435 A 12/2005

* cited by examiner

*Primary Examiner*—Gregory C Issing
(74) *Attorney, Agent, or Firm*—Crowell & Moring, LLP

(57) ABSTRACT

Disclosed is an antenna system, including: an antenna which can switch directivity thereof when receiving an analog television broadcasting signal; a switching section to switch the directivity of the antenna; a measurement section to measure radio wave quality of the analog television broadcasting signal received by the antenna by analyzing the analog television broadcasting signal when the directivity of the antenna is switched by the switching section; a storage section to store data of radio wave quality in different directions measured by the measurement section for each channel; and a control section to control the switching section to switch the directivity of the antenna to one direction having a highest radio wave quality among the different directions corresponding to a desired channel when the desired channel is designated.

3 Claims, 7 Drawing Sheets

FIG.3

39a

5ch

4ch

3ch

2ch

1ch

| DIRECTION INFORMATION | TV BROADCASTING SIGNAL RECEPTION | PDUR [ dB ] | ... |
|---|---|---|---|
| 0 | NOT RECEIVED | NULL | ... |
| 1 | NOT RECEIVED | NULL | ... |
| 2 | RECEIVED | 16 | ... |
| 3 | RECEIVED | 20 | ... |
| 4 | RECEIVED | 19 | ... |
| 5 | RECEIVED | 12 | ... |
| 6 | NOT RECEIVED | NULL | ... |
| 7 | NOT RECEIVED | NULL | ... |
| 8 | NOT RECEIVED | NULL | ... |
| 9 | RECEIVED | 15 | ... |
| 10 | RECEIVED | 23 | ... |
| 11 | RECEIVED | 28 | ... |
| 12 | RECEIVED | 21 | ... |
| 13 | RECEIVED | 17 | ... |
| 14 | NOT RECEIVED | NULL | ... |
| 15 | NOT RECEIVED | NULL | ... |

ANTENNA SYSTEM

BACKGROUND OF THE INVENTION

1. Field of the Invention

The present invention relates to an antenna system.

2. Description of Related Art

Conventionally, if an antenna system is to receive a television broadcasting signal (hereinafter, "TV broadcasting signal"), a user, for example, adjusts a direction and the like of an antenna while referring to an image displayed on a display section so that the antenna is oriented to an optimum receiving direction. This adjustment method, however, is quite cumbersome to a user. To deal with the problem, the following antenna systems are proposed. For example, Japanese Patent Application Laid-Open No. 2001-94899 discloses an antenna system that includes an indicator that can display a reception status of a TV broadcasting signal. A user can manually adjust a direction and the like of an antenna while referring to the reception status displayed by the indicator. Further, Japanese Patent Application Laid-Open No. 2001-86019 discloses an antenna system that can automatically adjust a direction and the like of an antenna in response to a request from a user.

There is also proposed an antenna system that includes an antenna apparatus having an antenna (commonly known "smart antenna") capable of automatically switching directivity of the antenna whenever a user designates a desired channel, and a television receiver. Specifically, the antenna apparatus is controlled by the television receiver based on a predetermined specification according to EIA/CEA-909 or the like to switch the directivity or the like of the smart antenna.

There has been established a method of deciding an optimum receiving direction of the smart antenna for a digital TV broadcasting signal using an intensity of the signal and an error rate. However, a method of deciding an optimum receiving direction of the smart antenna for an analog TV broadcasting signal is not established yet.

To deal with the problem, therefore, the following antenna systems are proposed. For example, Japanese Patent Application Laid-Open No. 2005-354435 discloses an antenna system that obtains horizontal synchronizing signals while sequentially switching the directivity of a smart antenna and determines one direction in which a center angle of a region in which the horizontal synchronizing signals can be continuously obtained is bisected as an optimum receiving direction of the smart antenna. If there are two or more regions in which the horizontal synchronizing signals can be continuously obtained, the antenna system determines one direction in which a greatest center angle is bisected as the optimum receiving direction of the smart antenna. Further, Japanese Patent Application Laid-Open No. 2005-318140 discloses an antenna system that determines one direction in which complexity of an image based on image data obtained from a received analog TV broadcasting signal is lowest as an optimum receiving direction of a smart antenna.

Although the proposed method disclosed in the Japanese Patent Application Laid-Open No. 2005-354435 is simple, the determined direction, in which a center angle of a region in which the horizontal synchronizing signals can be continuously obtained is bisected, is not always an optimum receiving direction. Therefore, it is difficult to accurately determine an optimum receiving direction.

The technique disclosed in the Japanese Patent Application Laid-Open No. 2005-318140 has the following problems. The optimum receiving direction determined when, for example, an image is greatly changed is not always an actual optimum receiving direction. Therefore, it is difficult to accurately determine an optimum receiving direction. Furthermore, with this method, it takes long operation time because it is necessary to carry out an image processing to determine the optimum receiving direction.

SUMMARY OF THE INVENTION

It is, therefore, a main object of the present invention to provide an antenna system which can accurately decide an optimum receiving direction of an antenna capable of switching directivity thereof.

According to a first aspect of the present invention, there is provided an antenna system, including: an antenna which can switch directivity thereof when receiving an analog television broadcasting signal; a switching section to switch the directivity of the antenna; a measurement section to measure radio wave quality of the analog television broadcasting signal received by the antenna by analyzing the analog television broadcasting signal when the directivity of the antenna is switched by the switching section; a storage section to store data of radio wave quality in different directions measured by the measurement section for each channel; and a control section to control the switching section to switch the directivity of the antenna to one direction having a highest radio wave quality among the different directions corresponding to a desired channel when the desired channel is designated.

According to a second aspect of the present invention, there is provided an antenna system, including: an antenna which can switch directivity thereof when receiving an analog television broadcasting signal; a switching section to switch the directivity of the antenna; a determining section to determine whether the analog television broadcasting signal is received by the antenna when the directivity of the antenna is switched by the switching section; a measurement section to measure radio wave quality of the analog television broadcasting signal received by the antenna by analyzing the analog television broadcasting signal if the determining section determines that the analog television broadcasting signal is received by the antenna; a storage section to store data of radio wave quality in different directions measured by the measurement section for each channel; and a control section to control the switching section to sequentially switch the directivity of the antenna in descending order of radio wave quality among the different directions corresponding to a desired channel when the desired channel is designated, until the determining section determines that the analog television broadcasting signal is received by the antenna.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 3 is a schematic diagram showing a data structure of a PDUR list shown in FIG. 1;

DESCRIPTION OF THE PREFERRED EMBODIMENTS

Figure 1:
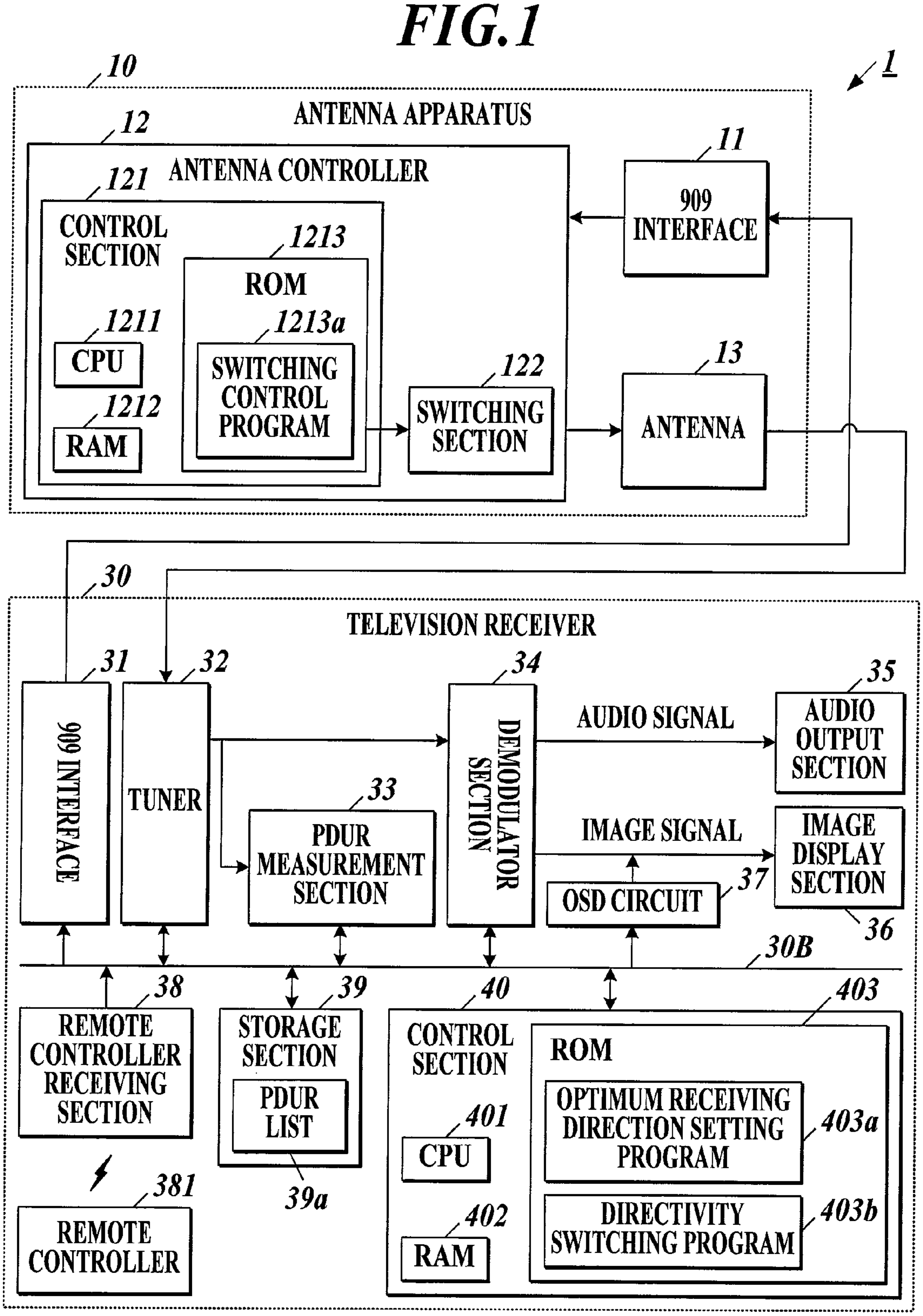
FIG. 1 is a block diagram showing a functional configuration of an antenna system according to preferred embodiments of the present invention.

An antenna system according to preferred embodiments of the present invention will be described with reference to the drawings. The scope of the present invention is not to be considered limited to what is shown in the drawings.

<Configuration of Antenna System>

A configuration of an antenna system 1 will first be described with reference to FIG. 1.

The antenna system 1 includes an antenna apparatus 10 and a television receiver 30 connected to the antenna apparatus 10.

The antenna apparatus 10 is connected to the television receiver 30 by an interface (hereinafter, "909 interface") for communication based on a predetermined communication method (e.g., EIA/CEA-909).

The antenna apparatus 10 receives a television broadcasting signal (hereinafter, "TV broadcasting signal") The television receiver 30 outputs an audio and an image based on the TV broadcasting signal received by the antenna apparatus 10.

(Antenna Apparatus)

A configuration of the antenna apparatus 10 will be described with reference to FIG. 1.

The antenna apparatus 10 includes a 909 interface 11, an antenna controller 12 and an antenna 13.

The 909 interface 11 is connected to a 909 interface 31 of the television receiver 30. The 909 interface 11 communicates with the 909 interface 31 of the television receiver 30 based on the predetermined communication method (e.g., EIA/CEA-909), receives a control signal such as a signal indicating a direction information (to be described later) for controlling the antenna apparatus 10 from the television receiver 30, and outputs the control signal to the antenna controller 12.

The antenna controller 12 includes a control section 121 and a switching section 122.

The control section 121 includes a CPU (Central Processing Unit) 1211, a RAM (Random Access Memory) 1212, and a ROM (Read Only Memory) 1213.

The CPU 1211 performs various control operations according to various processing programs for the antenna controller 12 stored in the ROM 1213.

The RAM 1212 includes a program storage area storing the processing programs or the like executed by the CPU 1211, and a data storage area storing input data, processing results or the like obtained when the processing programs are executed.

The ROM 1213 stores a system program executed by the antenna controller 12, various processing programs executable based on the system program, data used when the various processing programs are executed, and data on processing results of arithmetic processings performed by the CPU 1211. Each of the programs is stored in the ROM 1213 in the form of a computer readable program code.

Specifically, a switching control program 1213*a* and the like are stored in the ROM 1213.

The switching control program 1213*a* causes the CPU 1211 to control the switching section 122 to switch the directivity of the antenna 13 according to direction information transmitted from the television receiver 30.

Figure 2:
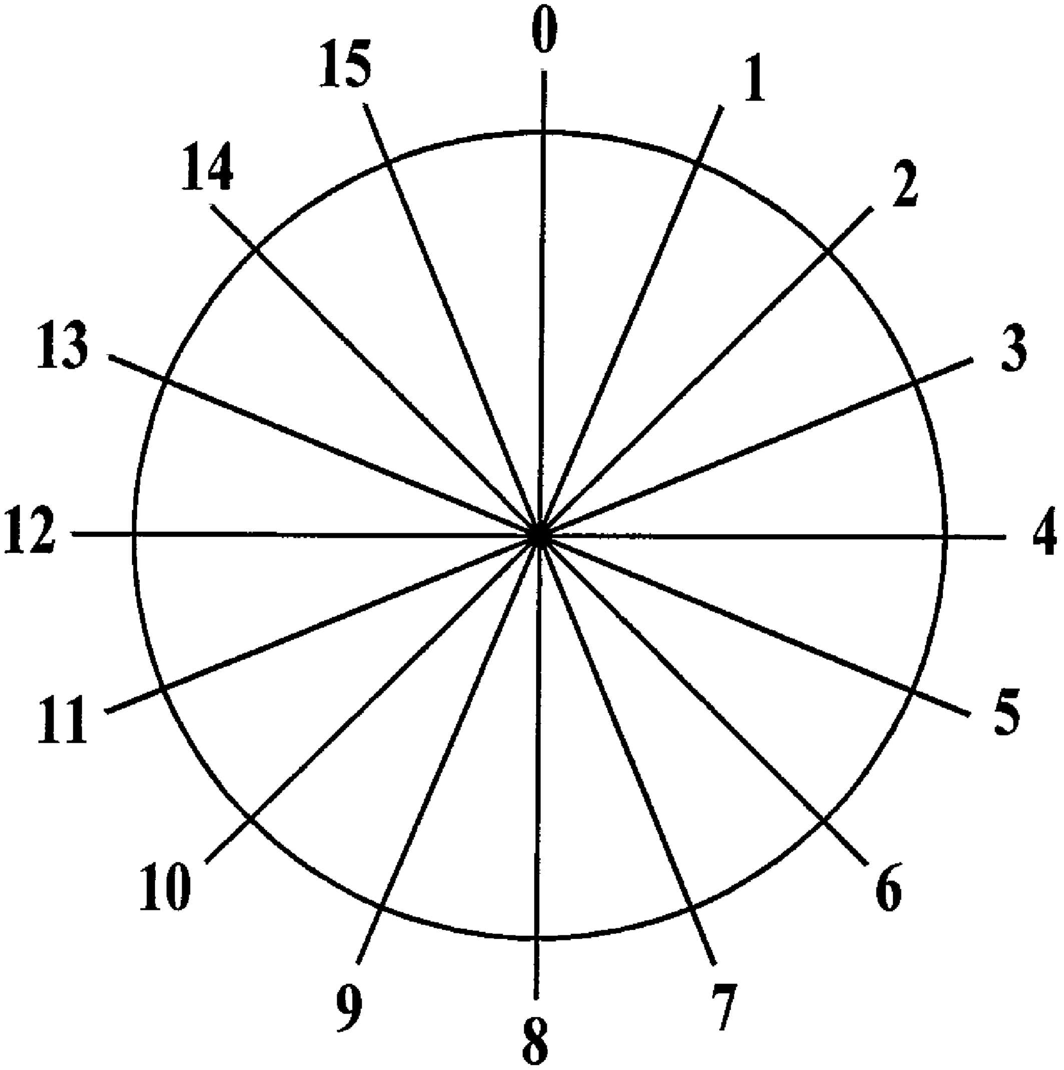
FIG. 2 is a schematic diagram showing different directions corresponding to directivity of an antenna shown in FIG. 1.

The direction information is, for example, information on directions corresponding to the directivity of the antenna 13. Specifically, as shown in FIG. 2, the direction information includes one of numbers (e.g., "0" to "15") assigned to the respective directions (e.g., 16 directions) corresponding to the directivity of the antenna 13.

The switching section 122 switches the directivity of the antenna 13 according to a control signal inputted from the control section 121.

The antenna 13 is a so-called smart antenna that can switch directivity thereof when receiving an analog TV broadcasting signal complying with, for example, NTSC (National Television Systems Committee) standards.

That is, when the switching section 122 switches the directivity to one of the different directions (e.g., 16 directions), the antenna 13 has a higher sensitivity to a TV broadcasting signal from the switched direction than those from the other directions.

The antenna 13 is connected to a tuner 32 of the television receiver 30. When the switching section 122 switches the directivity to one direction, the antenna 13 receives a TV broadcasting signal from the one direction and outputs the TV broadcasting signal to the tuner 32.

(Television Receiver)

A configuration of the television receiver 30 will be described with reference to FIG. 1.

The television receiver 30 includes the 909 interface 31, the tuner 32, a PDUR (Perceived DU Ratio) measurement section 33, a demodulator section 34, an OSD circuit 37, a remote controller receiving section 38, a storage section 39, and a control section 40. The respective sections of the television receiver 30 are connected to one another by a bus 30B.

The television receiver 30 also includes an audio output section 35 and an image display section 36 which are connected to the demodulator section 34.

The television receiver 30 further includes a remote controller 381 for the television receiver 30 communicable with the remote controller receiving section 38.

The 909 interface 31 is connected to the 909 interface 11 of the antenna apparatus 10. The 909 interface 31 communicates with the 909 interface 11 of the antenna apparatus 10 based on the predetermined communication method (e.g., EIA/CEA-909) in accordance with a control signal inputted from the control section 40, and transmits a control signal such as a signal indicating the direction information for controlling the antenna apparatus 10 to the antenna apparatus 10.

The tuner 32 is connected to the antenna 13 of the antenna apparatus 10. When one channel is set by the control section 40, the tuner 32 receives a TV broadcasting signal corresponding to the channel by tuning the TV broadcasting signal outputted from the antenna 13 to a frequency band corresponding to the channel, and outputs the received TV broadcasting signal to the PDUR measurement section 33 and to the demodulator section 34.

The PDUR measurement section 33 measures a PDUR as radio wave quality of the television broadcasting signal received by the antenna 13 by analyzing the signal according to a control signal inputted from the control section 40 when the directivity of the antenna 13 is switched by the switching section 122.

Specifically, if the switching section 122 switches the directivity of the antenna 13 and a CPU 401 (to be described later) that executes an optimum receiving direction setting program 403*a* determines that the TV broadcasting signal is received by the antenna 13, the PDUR measurement section 33 measures the PDUR of the TV broadcasting signal, which is received by the antenna 13 and outputted from the tuner 32, by analyzing the signal.

That is, when the directivity of the antenna 13 is switched to one direction from which it is determined in advance that the antenna 13 can receive the TV broadcasting signal, the PDUR measurement section 33 measures the PDUR of the TV broadcasting signal received by the antenna 13 by analyzing the signal.

The PDUR is an evaluation value objectively and quantitatively representing a degree of ghosting which is a kind of radio interference. A ghost is an unwanted image on the screen, appearing superimposed on the desired image. The PDUR is calculated by the following Equation (1).

$$PDUR = -10\log\sum_{i=1}^{n} 10^{-\frac{D/U_i + W_{\tau i} + W_{\phi i}}{10}} \tag{1}$$

In Equation (1), n is the number of ghosts, $D/U_i$ is a DU ratio [dB] of an i-th ghost, $W_{\tau i}$ is delay time weighted value [dB] of the i-th ghost, and $W_{\phi i}$ is a phase weighted value [dB] of the i-th ghost.

More specifically, the PDUR measurement section 33 includes a frequency converter, a synchronous detection circuit, an A/D converter, a CPU, a RAM, and a ROM, all of which are not shown in FIG. 2. For example, the frequency converter converts the TV broadcasting signal outputted from the tuner 32 into an intermediate frequency signal. The synchronous detection circuit generates two carrier waves having a phase difference of 90 degrees at the same frequency as that of the intermediate frequency signal, performs synchronous detection using each of the intermediate frequency signal and the two carrier waves, and acquires an in-phase video signal component and an orthogonal video signal component. The A/D converter converts a predetermined period of a rising part of a vertically synchronizing pulse of the in-phase video signal component and the orthogonal video signal component into digital signals. The RAM stores the digital in-phase video signal component and the digital orthogonal video signal component. Further, the CPU, which executes a program for the PDUR measurement section 33 stored in the ROM, obtains an intensity ratio (a DU ratio) of a desired wave to a reflected wave (a ghost wave), a delay time and a high frequency phase difference based on the data stored in the RAM. Then, the CPU calculates the PDUR by assigning the obtained values to the Equation (1).

The demodulator section 34 demodulates the TV broadcasting signal outputted from the tuner 32 according to a control signal inputted from the control section 40, separates the demodulated TV broadcasting signal into an audio signal and an image signal, and decodes the audio signal and the image signal. The demodulator section 34 outputs the decoded audio signal to the audio output section 35, and outputs the decoded image signal to the image display section 36.

Furthermore, the demodulator section 34 separates a vertically synchronizing signal (VSYNC) from the decoded image signal in accordance with a control signal inputted from the control section 40, and outputs the vertically synchronizing signal to the control section 40.

The audio output section 35, which is, for example, a loudspeaker, outputs an audio according to audio data based on the audio signal outputted from the demodulator section 34.

The image display section 36, which is, for example, a liquid crystal display, displays an image according to image data based on the image signal outputted from the demodulator section 34. The image display section 36 further displays an image according to image data based on an image signal which is outputted from the demodulator section 34 and combined with an OSD display signal (to be described later) by the OSD circuit 37.

The OSD circuit 37 combines the OSD display signal for causing the image display section 36 to carry out a predetermined OSD display (on-screen display) with the image signal outputted from the demodulator section 34 to the image display section 36 in accordance with a control signal inputted from the control section 40.

The remote controller receiving section 38 receives various signals transmitted from the remote controller 381 and outputs various pieces of data based on the signals to the control section 40.

When a user operates the remote controller 381, for example, the remote controller 381 transmits a signal corresponding to the operation to the remote controller receiving section 38.

The storage section 39 has a recording medium such as a magnetic recording medium, an optical recording medium or a semiconductor memory.

The storage section 39 stores information as to whether a TV broadcasting signal is received by the antenna 13 or not, which is judged by the CPU 401 (to be described later) that executes the optimum receiving direction setting program 403*a*, in different directions for each channel. The storage section 39 further stores values of PDUR in different direction measured by the PDUR measurement section 33 for each channel.

Specifically, as shown in FIG. 3, the storage section 39 stores one PDUR list 39*a* for each channel. The PDUR list 39*a* includes a "direction information" storage area, a "TV broadcasting signal reception" storage area and a "PDUR" storage area. The "direction information" storage area stores direction information. The "TV broadcasting signal reception" storage area stores data as to whether a TV broadcasting signal is received by the antenna 13 or not, which is judged by the CPU 401 that executes the optimum receiving direction setting program 403*a*. The "PDUR" storage area stores the values of PDUR measured by the PDUR measurement section 33.

The control section 40 includes the CPU 401, a RAM 402 and a ROM 403.

The CPU 401 performs various control operations according to various processing programs for the television receiver 30 stored in the ROM 403.

The RAM 402 includes a program storage area storing the processing programs or the like executed by the CPU 401, a data storage area storing input data, processing results or the like obtained when the processing programs are executed, and the like.

The ROM 403 stores a system program executable by the television receiver 30, various processing programs executable based on the system program, data used when the various processing programs are executed, and data on processing results of arithmetic processings performed by the CPU 401.

Each of the programs is stored in the ROM 403 in the form of a computer readable program code.

Specifically, the optimum receiving direction setting program 403*a* and a directivity switching program 403*b* are stored in the ROM 403.

The optimum receiving direction setting program 403*a* causes the CPU 401 to carry out the following processing.

The CPU 401 determines whether a TV broadcasting signal is received by the antenna 13 or not when the switching section 122 switches the directivity of the antenna 13 during an initial setting or the like of the antenna system 1. If the TV broadcasting signal is received by the antenna 13, the CPU 401 controls the PDUR measurement section 33 to analyze the TV broadcasting signal received by the antenna 13 and to measure the PDUR.

Specifically, the CPU 401 outputs a control signal to the 909 interface 31 so that the 909 interface 31 sequentially transmits the direction information (which is represented as numbers from "0" to "15") to the antenna apparatus 10 by sequentially switching from one number to another within a range of "0" to "15" in order to sequentially switch the directivity of the antenna 13. Whenever the directivity of the antenna 13 is switched, the CPU 401 determines whether the demodulator section 34 outputs a vertically synchronizing signal, thereby determining whether the TV broadcasting signal is received by the antenna or not. Then the CPU 401 stores the determination results corresponding to the respective directions into the PDUR list 39*a*.

Next, the CPU 401 outputs another control signal to the 909 interface 31 so that the 909 interface 31 sequentially transmits the direction information corresponding to directions from which the TV broadcasting signal is received by the antenna 13, based on the determination results stored in the PDUR list 39*a*, in order to sequentially switch the directivity of the antenna 13. Next, whenever the directivity of the antenna 13 is switched, the CPU 401 outputs a control signal to the PDUR measurement section 33 so that the PDUR measurement section 33 analyzes the TV broadcasting signal outputted from the tuner 32 and measures the PDUR. Then the CPU 401 stores the measurement results corresponding to the respective directions into the PDUR list 39*a*.

It is to be noted that the CPU 401 regularly executes the optimum receiving direction setting program 403*a* and regularly updates the PDUR list 39*a*.

The CPU 401 functions as a determining section by executing the optimum receiving direction setting program 403*a*.

The directivity switching program 403*b* causes the CPU 401 to carry out the following processing.

When a channel desired by a user is designated during normal operation of the antenna system 1, the CPU 401 controls the switching section 122 to sequentially switch the directivity of the antenna 13 in descending order of PDUR value among the different directions, which are stored in the PDUR list 39*a*, corresponding to the desired channel until the CPU 401 determines that the TV broadcasting signal is received by the antenna 13.

Specifically, when a channel desired by a user is designated by operating the remote controller 381 or the like, the CPU 401 outputs a control signal to the 909 interface 31 so that the 909 interface 31 transmits the direction information corresponding to the highest value of PDUR stored in the PDUR list 39*a* of the desired channel, to the antenna apparatus 10 in order to switch the directivity of the antenna 13. Next, the CPU 401 determines whether the demodulator section 34 outputs a vertically synchronizing signal, thereby determining whether the TV broadcasting signal is received by the antenna 13 or not.

If the CPU 401 determines that the TV broadcasting signal is not received by the antenna 13, then the CPU 401 outputs a control signal to the 909 interface 31 so that the 909 interface 31 sequentially transmits the direction information stored in the PDUR list 39*a* of the desired channel to the antenna apparatus 10 in descending order of PDUR value in order to sequentially switch the directivity of the antenna 13 until the CPU 401 determines that the TV broadcasting signal is received by the antenna 13.

At this time, if more than one direction among the different directions is equal in PDUR value, the CPU 401 controls the 909 interface 31 to transmit direction information corresponding to one direction closest to a present direction of the antenna 13 among the more than one direction, to the antenna apparatus 10. If there are two different directions closest to the present direction of the antenna 13, the CPU 401 controls the 909 interface 31 to transmit direction information corresponding to one of the two different directions so that the directivity of the antenna 13 is switched clockwise, to the antenna apparatus 10.

The CPU 401 functions as a determining section and a control section by executing the directivity switching program 403*b*.

<Processings Performed by Antenna System>

Next, a processing performed by the antenna system 1 will be described.

(Setting Processing of Optimum Receiving Direction)

Figure 4:
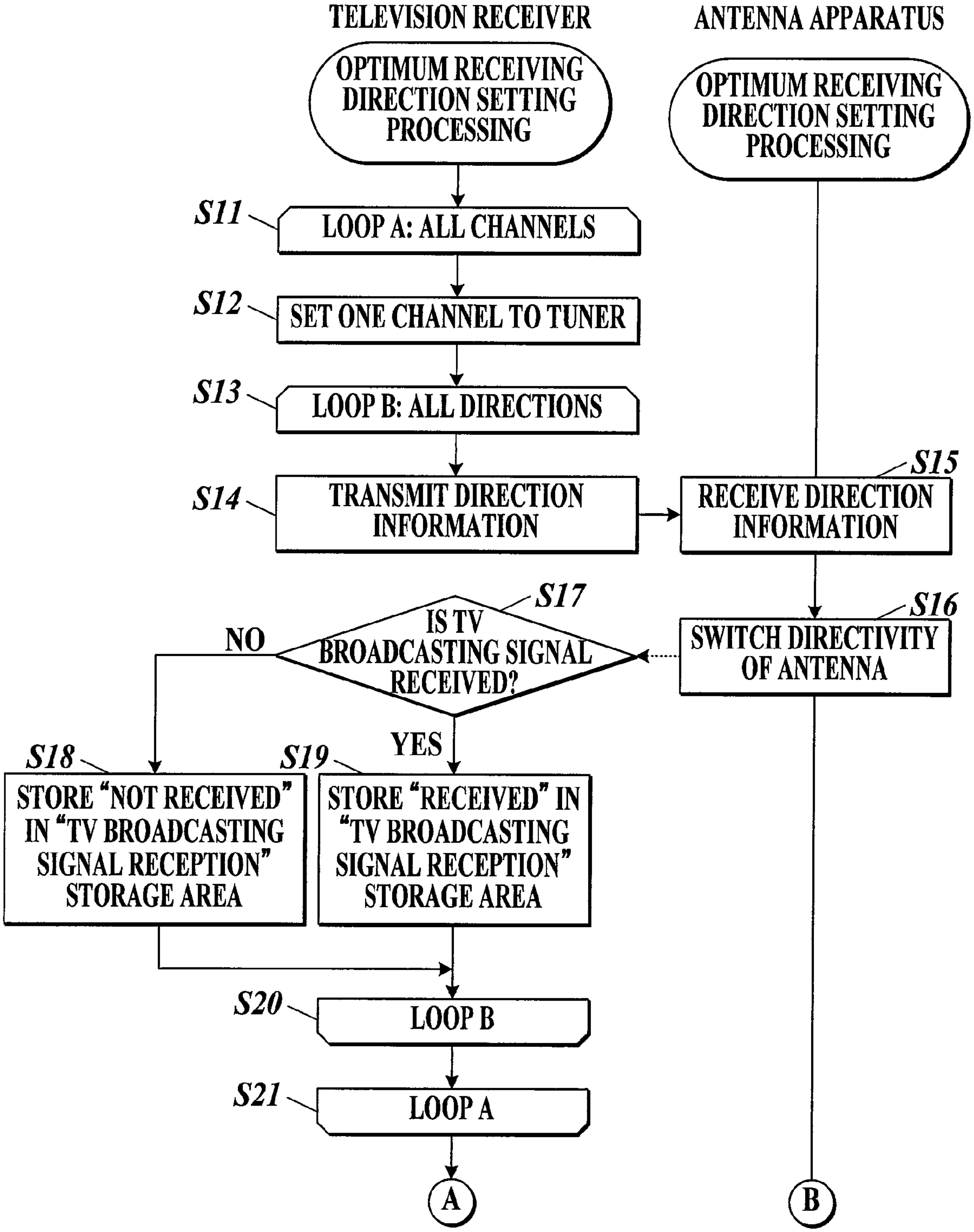
FIG. 4 is a flowchart for explaining a first processing with respect to a setting of an optimum receiving direction of the antenna executed by the antenna system according to the preferred embodiment of the present invention.
Figure 5:
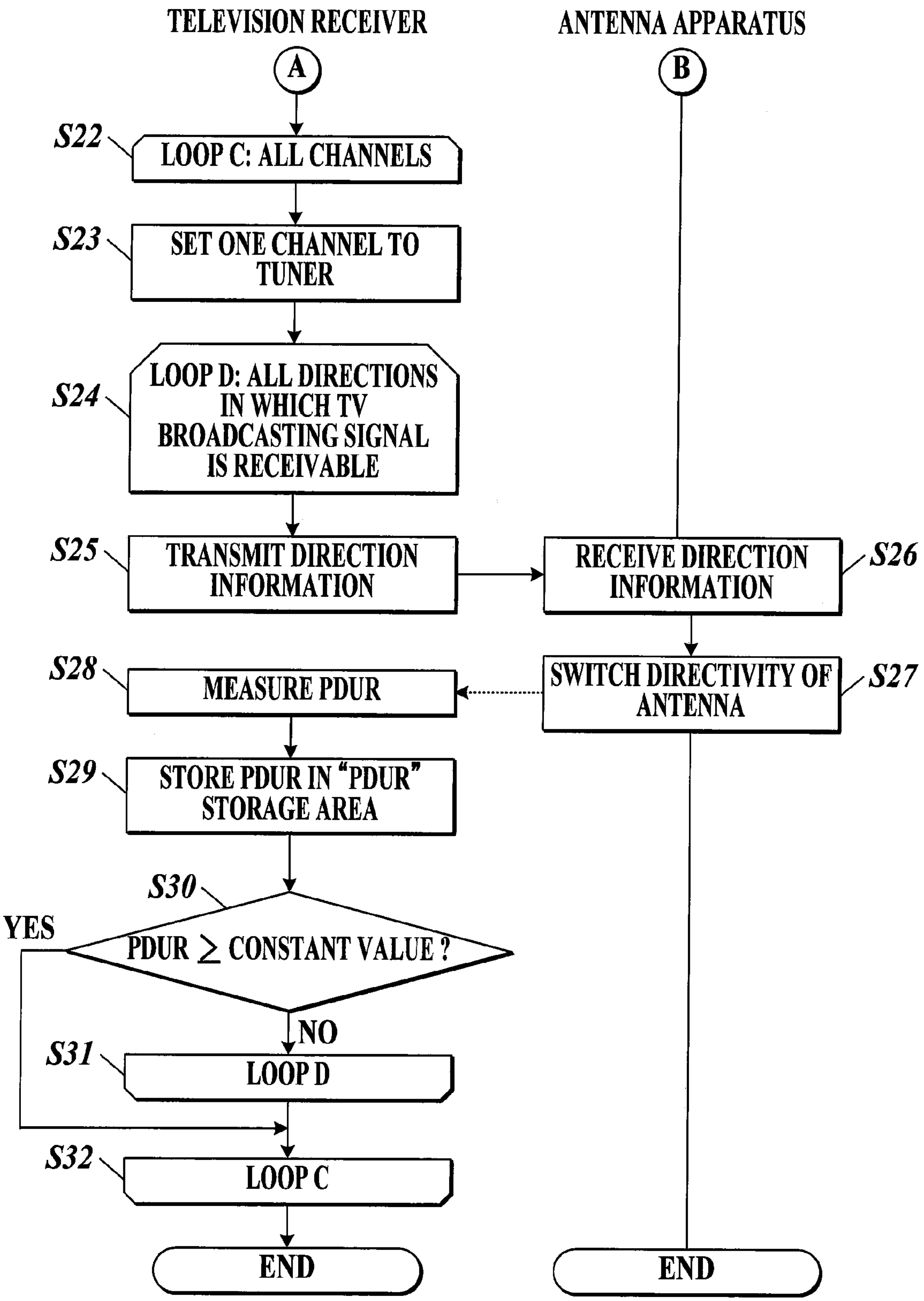
FIG. 5 is a flowchart for explaining a second processing with respect to a setting of the optimum receiving direction of the antenna executed by the antenna system according to the preferred embodiments of the present invention.

A setting processing of an optimum receiving direction of the antenna 13 executed by the antenna system 1 will first be described with reference to the flowcharts of FIGS. 4 and 5.

The CPU 401 of the television receiver 30 first performs a loop A processing for all channels receivable by the antenna system 1 by executing the optimum receiving direction setting program 403*a* (steps S11 to S21).

Specifically, in the loop A processing for one channel, the CPU 401 sets the channel to the tuner 32 (step S12). Then, the CPU 401 performs a loop B processing for all directions to which the directivity of the antenna 13 can be switched (steps S13 to S20).

Specifically, in the loop B processing for one direction, the CPU 401 outputs a control signal to the 909 interface 31 to transmit the direction information on one direction to the antenna apparatus 10 (step S14).

When the 909 interface 11 of the antenna apparatus 10 receives the direction information on one direction transmitted in step S14 (step S15), the CPU 1211 of the antenna apparatus 10 controls the switching section 122 to switch the directivity of the antenna 13 to the one direction according to the direction information received in step S15 by executing the switching control program 1213*a* (step S16).

Next, the CPU 401 of the television receiver 30 determines whether a TV broadcasting signal is received by the antenna 13 based on whether a vertically synchronizing signal is outputted from the demodulator section 34 (step S17).

If the CPU 401 determines that the TV broadcasting signal is not received by the antenna 13 because the vertically synchronizing signal is not outputted from the demodulator section 34 (step S17; No), then the CPU 401 stores "NOT RECEIVED" in the "TV broadcasting signal reception" storage area corresponding to the direction information on one direction in the PDUR list 39*a* for one channel (step S18), and finishes the loop B processing for one direction.

If the CPU 401 determines that the TV broadcasting signal is received by the antenna 13 because the vertically synchronizing signal is outputted from the demodulator section 34 (step S17; Yes), then the CPU 401 stores "RECEIVED" in the "TV broadcasting signal reception" storage area corresponding to the direction information on one direction in the PDUR list 39*a* for one channel (step S19), and finishes the loop B processing for one direction.

If the loop B processing for all the directions to which the directivity of the antenna 13 can be switched is finished (step S20), the CPU 401 finishes the loop A processing for one channel.

If the loop A processing for all the channels receivable by the antenna system 1 is finished (step S21), the CPU 401 performs a loop C processing for all the channels receivable by the antenna system 1 (steps S22 to S31).

Specifically, in the loop C processing for one channel, the CPU 401 sets one channel to the tuner 32 (step S23). Then, the CPU 401 performs a loop D processing for directions corresponding to all the pieces of direction information with respect to which "RECEIVED" is stored in the "TV broadcasting signal reception" storage area in the PDUR list 39*a* for the channel, that is, all the directions in which the antenna 13 can receive a TV broadcasting signal corresponding to the channel (steps S24 to S30).

Specifically, in a loop D processing for one direction, the CPU 401 outputs a control signal to the 909 interface 31 to transmit one piece of direction information on the direction to the antenna apparatus 10 (step S25).

When the 909 interface 11 of the antenna apparatus 10 receives the one piece of direction information on the direction transmitted in step S25 (step S26), the CPU 1211 of the antenna apparatus 10 controls the switching section 122 to switch the directivity of the antenna 13 to the direction according to the one piece of direction information received in step S26 by executing the switching control program 1213*a* (step S27).

Next, the CPU 401 of the television receiver 30 outputs a control signal to the PDUR measurement section 33 so that the PDUR measurement section 33 measures a PDUR of the TV broadcasting signal, which is received by the antenna 13 and outputted from the tuner 32, by analyzing the signal (step S28).

Next, the CPU 401 stores the PDUR value measured in step S28 into the "PDUR" storage area corresponding to the one piece of direction information on the direction in the PDUR list 39*a* for the channel (step S29).

Next, the CPU 401 determines whether the PDUR value stored in step S29 is equal to or greater than a constant value (step S30). The constant value can be appropriately set and is sufficiently high value. That is, radio wave quality is considered to be sufficiently high if the PDUR value is greater than the constant value.

If the CPU 401 determines that the PDUR value stored in step S29 is equal to or greater than the constant value (step S30; Yes), the CPU 401 forcedly quits the loop D processing for all the directions in which the antenna 13 can receive a TV broadcasting signal corresponding to the channel, thus finishing the loop C processing for the channel.

If the CPU 401 determines that the PDUR value stored in step S29 is less than the constant value (step S30; No), the CPU 401 finishes the loop D processing for the one direction.

If the loop D processing for all the directions in which the antenna 13 can receive a TV broadcasting signal corresponding to the one channel is finished (step S31), the CPU 401 finishes the loop C processing for the channel.

If the loop C processing for all the channels receivable by the antenna system 1 is finished (step S32), the CPU 401 finishes the optimum receiving direction setting processing.

(Directivity Switching Processing)

Figure 6A:
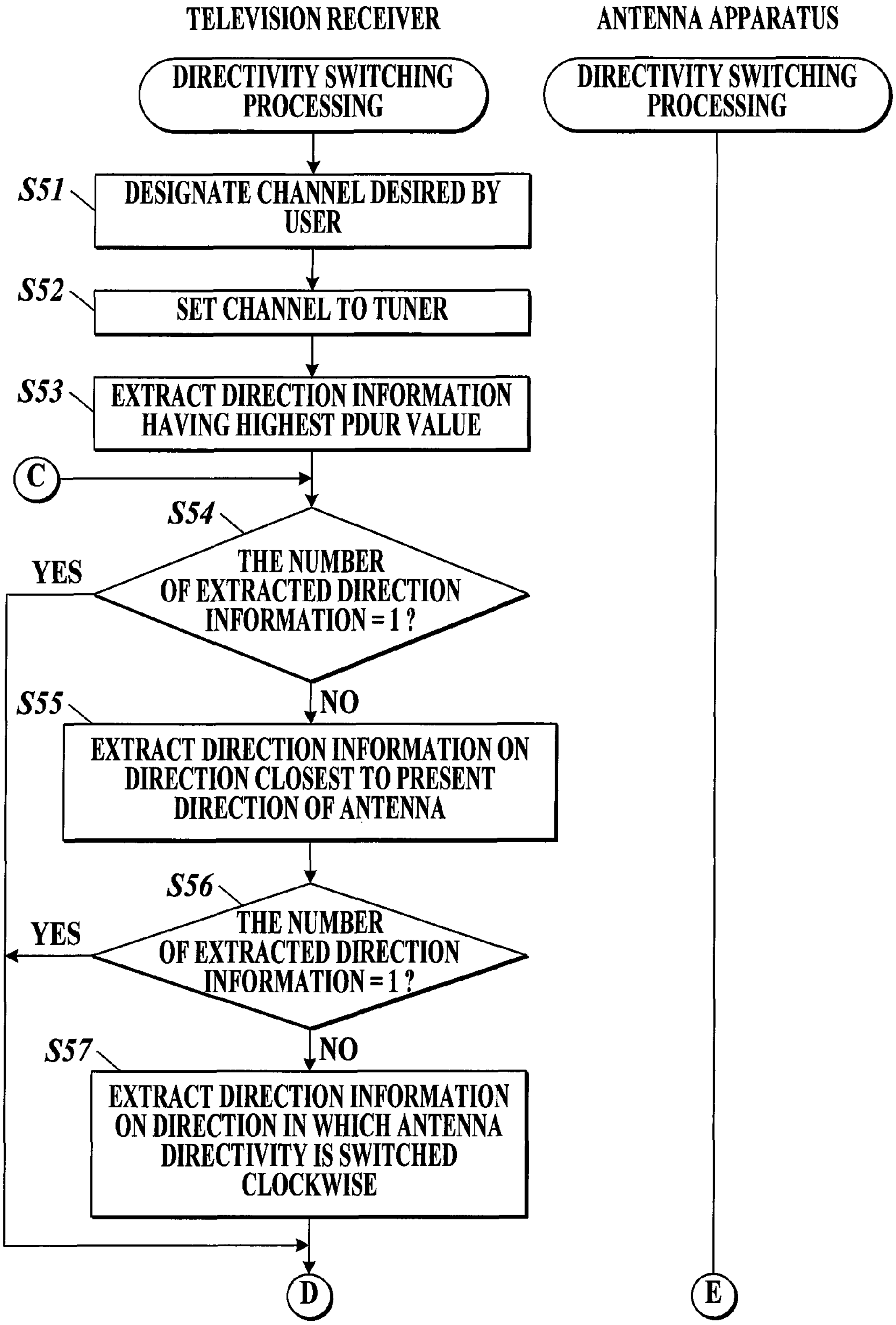
FIGS. 6A and 6B are flowcharts for explaining a directivity switching processing executed by the antenna system according to the preferred embodiments of the present invention.
Figure 6B:
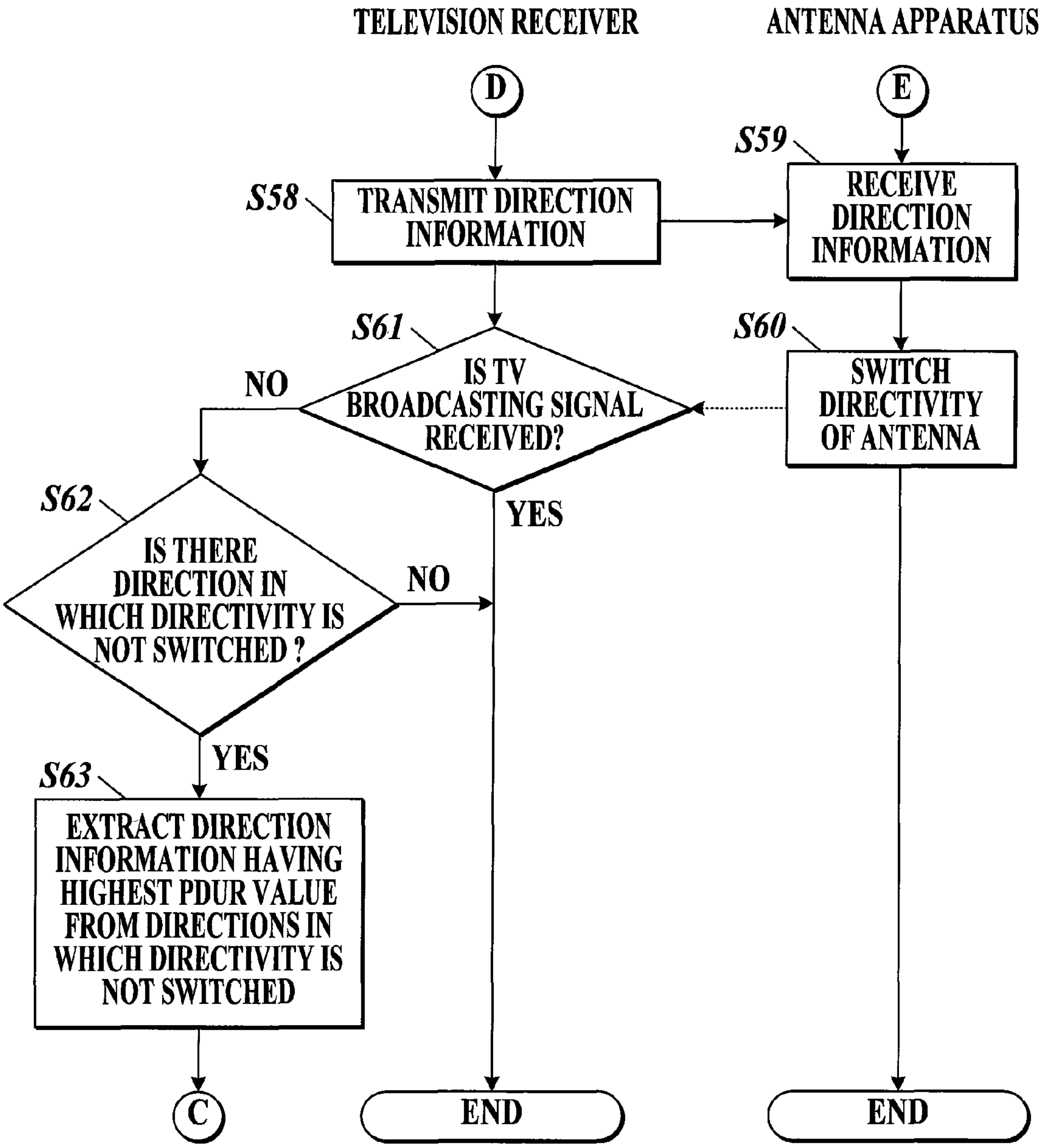

Next, a switching processing of directivity of the antenna 13 executed by the antenna system 1 will be described with reference to the flowchart of FIGS. 6A and 6B.

If a channel desired by a user is designated by operating the remote controller 381 by the user (step S51), the CPU 401 of the television receiver 30 first sets the channel designated in step S51 to the tuner 32 by executing the directivity switching program 403*b* (step S52).

The CPU 401 searches the PDUR list 39*a* for the channel designated in step S51, and extracts direction information having highest PDUR from the PDUR list 39*a* (step S53).

Next, the CPU 401 determines whether the number of direction information extracted in step S53 is one (step S54).

If the CPU 401 determines that the number of direction information extracted in step S53 is one (step S54; Yes), the CPU 401 outputs a control signal to the 909 interface 31 to transmit the direction information extracted in step 53 to the antenna apparatus 10 (step S58).

If the CPU 401 determines that the number of direction information extracted in step S53 is not one (step S54; No), the CPU 401 extracts one or more pieces of direction information corresponding to one or more directions closest to a present direction of the antenna 13 from the plural pieces of direction information extracted in step S53 (step S55).

Next, the CPU 401 determines whether the number of direction information extracted in step S55 is one (step S56).

If the CPU 401 determines that the number of direction information extracted in step S55 is one (step S56; Yes), the CPU 401 outputs a control signal to the 909 interface 31 to transmit the direction information extracted in step S55 to the antenna apparatus 10 (step S58).

If the CPU 401 determines that the number of direction information extracted in step S55 is not one (step S56; No), the CPU 401 extracts one piece of direction information on one direction from the plural pieces of direction information extracted in step S55 so that the directivity of the antenna 13 is switched clockwise (step S57). Then the CPU 401 outputs a control signal to the 909 interface 31 to transmit the one piece of direction information extracted in step S57 to the antenna apparatus 10 (step S58).

When the 909 interface 11 of the antenna apparatus 10 receives the one piece of direction information transmitted in step S58 (step S59), the CPU 1211 of the antenna apparatus 10 controls the switching section 122 to switch the directivity of the antenna 13 to one direction based on the one piece of direction information received in step S59 by executing the switching control program 1213*a* (step S60).

Next, the CPU 401 of the television receiver 30 determines whether a TV broadcasting signal is received by the antenna 13 or not based on whether a vertically synchronizing signal is outputted from the demodulator section 34 (step S61).

If the CPU 401 determines that TV broadcasting signal is not received by the antenna 13 (step S61; No), the CPU 401 determines whether there is a direction to which the directivity of the antenna 13 is not switched (step S62).

If the CPU 401 determines that there is one or more directions to which the directivity of the antenna 13 is not switched (step S62; Yes), then the CPU 401 searches the PDUR list 39*a* for the channel designated in step S51, extracts direction information having the highest PDUR value from the one or more pieces of direction information corresponding to the one or more directions to which the directivity of the antenna 13 is not switched (step S63), and repeatedly performs processings in step S54 and the subsequent steps.

If the CPU 401 determines that there is no direction to which the directivity of the antenna 13 is not switched (step S62; No), the CPU 401 finishes the directivity switching processing.

If the CPU 401 determines that the TV broadcasting signal is received by the antenna 13 (step S61; Yes), the CPU 401 finishes the directivity switching processing.

The antenna system 1 of the preferred embodiments of the present invention includes the antenna 13 capable of switching directivity thereof when receiving an analog TV broadcasting signal. The switching section 122 can switch the directivity of the antenna 13 during the initial setting of the antenna system 1. The PDUR measurement section 33 can analyze the TV broadcasting signal received by the antenna 13 to measure a PDUR thereof that is a ghost evaluation value when the switching section 122 switches the directivity of the antenna 13. The storage section 39 can store the PDUR list 39*a* storing PDUR values corresponding to different directions measured by the PDUR measurement section 33 for each channel. If a channel desired by a user is designated by operating the remote controller 381 by the user during a normal operation, the CPU 401, which executes the directivity switching program 403*b*, controls the switching section 122 to switch the directivity of the antenna 13 to one direction having the highest PDUR value among the different directions corresponding to the desired channel.

That is, since the PDUR which represents a degree of ghosting is measured and the optimum receiving direction of the antenna 13 is decided, it is possible to accurately decide the optimum receiving direction of the antenna 13 capable of switching directivity thereof.

Furthermore, the CPU 401, which executes the optimum receiving direction setting program 403*a* or the directivity switching program 403*b*, can determine whether a TV broadcasting signal is received by the antenna 13 when the switching section 122 switches the directivity of the antenna 13. The PDUR measurement section 33 can analyze the TV broadcasting signal received by the antenna 13 to measure the PDUR thereof if the CPU 401 that executes the optimum receiving direction setting program 403*a* determines that a TV broadcasting signal is received by the antenna 13.

Therefore, as compared with measuring the PDUR whenever the directivity of the antenna 13 is switched, the unnecessary measurement of PDUR can be reduced and the optimum receiving direction of the antenna 13 can be efficiently decided.

Moreover, the CPU 401 executing the directivity switching program 403*b* can control the switching section 122 to switch the directivity of the antenna 13 in descending order of PDUR value among the different directions corresponding to the user-desired channel, which is stored in the PDUR list 39*a* of the storage section 39, until the CPU 401 determines that a TV broadcasting signal is received by the antenna 13.

Since the directivity of the antenna 13 can be switched in descending order of probabilities of the optimum receiving direction of the antenna 13, the optimum receiving direction of the antenna 13 can be efficiently decided.

Furthermore, if more than one direction among the different directions corresponding to the user-desired channel is equal in PDUR value, the CPU 401 executing the directivity switching program 403*b* can control the switching section 122 to switch the directivity of the antenna 13 to one direction closest to a present direction of the antenna 13 among the more than one direction.

Because a switching angle at the time of switching the direction of the antenna 13 can be minimized, the optimum receiving direction of the antenna 13 can be stably decided.

The present invention is not limited to the above-described embodiments. It will be apparent that various changes may be made without departing from the scope of the invention.

For example, the antenna system 1 can be configured to be able to receive not only the analog TV broadcasting signal but also a digital TV broadcasting signal.

Moreover, timing of the PDUR measurement can be arbitrarily set as long as the PDUR is measured when the directivity is switched to one direction from which a TV broadcasting signal is received.

Specifically, in the embodiment, it is determined whether a TV broadcasting signal is received by the antenna 13 while the directivity of the antenna 13 is sequentially switched clockwise for one channel, and then the PDUR is measured while the directivity of the antenna 13 is further switched clockwise sequentially. Alternatively, while the directivity of the antenna 13 is sequentially switched clockwise, it can be determined whether a TV broadcasting signal is received by the antenna 13 or not and the PDUR can be measured. That is, when the directivity of the antenna 13 is switched to one direction, it is determined whether a TV broadcasting signal is received by the antenna 13 or not and the PDUR is measured if it is determined that a TV broadcasting signal is received by the antenna 13. After that, the directivity of the antenna 13 can be switched to the other direction.

In the embodiment, after it is determined whether a TV broadcasting signal is received by the antenna 13 for all the channels, PDUR values are measured for all the channels. Alternatively, it can be determined whether a TV broadcasting signal is received by the antenna 13 or not and the PDUR values can be measured for all the channels. That is, when one channel is set to the tuner 32, it can be determined whether a TV broadcasting signal is received by the antenna 13 or not and the PDUR values can be measured for the channel. After that, the other channel can be set to the tuner 32.

For example, in the optimum receiving direction setting processing (FIGS. 4 and 5), if the PDUR value stored in the "PDUR" storage area is equal to or greater than the constant value which can be appropriately set and is sufficiently high value (i.e., radio wave quality is considered to be sufficiently high if the PDUR value is greater than the constant value), the CPU 401 forcedly quits the loop D processing for all the directions in which the antenna 13 can receive a TV broadcasting signal corresponding to one channel. However, the present invention is not limited to this. For example, even if the PDUR value stored in the "PDUR" storage area is equal to or greater than the constant value, the loop D processing can be performed on all the directions in which the antenna 13 can receive a TV broadcasting signal corresponding to the one channel.

For example, the radio wave quality is not limited to the PDUR but an arbitrary evaluation value can be used as the radio wave quality as long as the evaluation value represents the quality of the TV broadcasting signal (radio wave) received by the antenna 13.

According to a first aspect of the preferred embodiments of the present invention, there is provided an antenna system, including: an antenna which can switch directivity thereof when receiving an analog television broadcasting signal; a switching section to switch the directivity of the antenna; a measurement section to measure radio wave quality of the analog television broadcasting signal received by the antenna by analyzing the analog television broadcasting signal when the directivity of the antenna is switched by the switching section; a storage section to store data of radio wave quality in different directions measured by the measurement section for each channel; and a control section to control the switching section to switch the directivity of the antenna to one direction having a highest radio wave quality among the different directions corresponding to a desired channel when the desired channel is designated.

According to the present invention, when the directivity of the antenna is switched, then the radio wave quality (e.g., PDUR that is a ghost evaluation value) can be measured by analyzing the television broadcasting signal received by the antenna, and the measured radio wave quality in each direction can be stored for each channel. When a desired channel is designated, the directivity of the antenna can be switched to the direction having the highest radio wave quality among the different directions corresponding to the desired channel.

That is, because the optimum receiving direction of the antenna is decided based on the radio wave quality, it is possible to accurately decide the optimum receiving direction of the antenna capable of switching directivity thereof.

Preferably, the antenna system further includes a determining section to determine whether the analog television broadcasting signal is received by the antenna when the directivity of the antenna is switched by the switching section, wherein if the determining section determines that the analog television broadcasting signal is received by the antenna, the measurement section measures the radio wave quality of the analog television broadcasting signal by analyzing the analog television broadcasting signal.

Preferably, the control section controls the switching section to sequentially switch the directivity of the antenna in descending order of radio wave quality among the different directions corresponding to the desired channel until the determining section determines that the analog television broadcasting signal is received by the antenna.

Preferably, if more than one direction among the different directions corresponding to the desired channel is equal in radio wave quality, the control section controls the switching section to switch the directivity of the antenna to one direction which is closest to a present direction of the antenna among the more than one direction.

According to a second aspect of the preferred embodiments of the present invention, there is provided an antenna system, including: an antenna which can switch directivity thereof when receiving an analog television broadcasting signal; a switching section to switch the directivity of the antenna; a determining section to determine whether the analog television broadcasting signal is received by the antenna when the directivity of the antenna is switched by the switching section;

a measurement section to measure radio wave quality of the analog television broadcasting signal received by the antenna by analyzing the analog television broadcasting signal if the determining section determines that the analog television broadcasting signal is received by the antenna; a storage section to store data of radio wave quality in different directions measured by the measurement section for each channel; and a control section to control the switching section to sequentially switch the directivity of the antenna in descending order of radio wave quality among the different directions corresponding to a desired channel when the desired channel is designated, until the determining section determines that the analog television broadcasting signal is received by the antenna.

The entire disclosure of Japanese Patent Application No. 2007-109328 filed on Apr. 18, 2007 including specification, claims, drawings and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. An antenna system, comprising:

an antenna having switchable directivity when receiving an analog television broadcasting signal;

a switching section that switches the directivity of the antenna;

a measurement section that measures radio wave quality of the analog television broadcasting signal received by the antenna by analyzing the analog television broadcasting signal when the directivity of the antenna is switched by the switching section;

a storage section that stores data of radio wave quality in different directions measured by the measurement section for each channel;

a control section that controls the switching section to switch the directivity of the antenna to one direction having a highest radio wave quality among the different directions corresponding to a desired channel when the desired channel is designated; and a determining section that determines whether the analog television broadcasting signal is received by the antenna when the directivity of the antenna is switched by the switching section, wherein if the determining section determines that the analog television broadcasting signal is received by the antenna, the measurement section measures the radio wave quality of the analog television broadcasting signal by analyzing the analog television broadcasting signal, and the control section controls the switching section to sequentially switch the directivity of the antenna in descending order of radio wave quality among the different directions corresponding to the desired channel until the determining section determines that the analog television broadcasting signal is received by the antenna.

2. The antenna system according to claim 1, wherein when more than one direction among the different directions corresponding to the desired channel is equal in radio wave quality, the control section controls the switching section to switch the directivity of the antenna to one direction which is closest to a present direction of the antenna among the more than one direction.

3. An antenna system, comprising:

an antenna having switchable directivity when receiving an analog television broadcasting signal;

a switching section that switches the directivity of the antenna;

a determining section that determines whether the analog television broadcasting signal is received by the antenna when the directivity of the antenna is switched by the switching section;

a measurement section that measures radio wave quality of the analog television broadcasting signal received by the antenna by analyzing the analog television broadcasting signal if the determining section determines that the analog television broadcasting signal is received by the antenna;

a storage section that stores data of radio wave quality in different directions measured by the measurement section for each channel; and a control section that controls the switching section to sequentially switch the directivity of the antenna in descending order of radio wave quality among the different directions corresponding to a desired channel when the desired channel is designated, until the determining section determines that the analog television broadcasting signal is received by the antenna.

* * * * *